US007865206B2

(12) United States Patent
Quoc et al.

(10) Patent No.: US 7,865,206 B2
(45) Date of Patent: Jan. 4, 2011

(54) EMPLOYING MATCHING OF EVENT CHARACTERISTICS TO SUGGEST ANOTHER CHARACTERISTIC OF AN EVENT

(75) Inventors: Michael Quoc, San Francisco, CA (US); Andrew Baio, Palo Alto, CA (US); Daniel James Wascovich, San Francisco, CA (US); Edward Ho, San Jose, CA (US); Edward Stanley Ott, IV, Palo Alto, CA (US); Gordon David Luk, Jr., Sunnyvale, CA (US); Nathanael Joe Hayashi, Piedmont, CA (US); Jonathan James Trevor, Santa Clara, CA (US); Leonard Lin, Palo Alto, CA (US); Matthew Fukuda, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 538 days.

(21) Appl. No.: 11/688,749

(22) Filed: Mar. 20, 2007

(65) Prior Publication Data

US 2008/0235084 A1 Sep. 25, 2008

(51) Int. Cl.
*H04B 7/00* (2006.01)
*H04M 3/42* (2006.01)
*H04W 4/00* (2009.01)
(52) U.S. Cl. .................. 455/519; 455/518; 455/517
(58) Field of Classification Search ................ 455/517, 455/518, 519, 521, 520, 416, 466
See application file for complete search history.

(56) References Cited

U.S. PATENT DOCUMENTS 6,996,413 B2* 2/2006 Inselberg .................... 455/517
7,103,379 B2* 9/2006 Hilerio ...................... 455/556.1
7,248,888 B2* 7/2007 Inselberg .................... 455/517
7,639,634 B2* 12/2009 Shaffer et al. ............... 370/266
7,684,815 B2* 3/2010 Counts et al. ............... 455/518
2001/0031632 A1* 10/2001 Benz et al. .................. 455/414

(Continued)

FOREIGN PATENT DOCUMENTS

WO 2005/114970 A2 12/2005

OTHER PUBLICATIONS

U.S. Appl. No. 11/555,247, filed Oct. 31, 2006.

(Continued)

*Primary Examiner*—Tilahun Gesesse
(74) *Attorney, Agent, or Firm*—Frommer Lawrence & Haug LLP; Jamie L. Wiegand

(57) ABSTRACT

A device, system, and method are directed towards determining a suggested characteristic for an event. At least two events are determined. In one embodiment, at least one characteristic is determined for one of the event. A plurality of other characteristics is determined for the other event. The characteristics of the two events may be determined implicitly from communications during the events or from user input. Based on a relationship between the determined characteristics, the suggested characteristic for the event is then determined. In one embodiment, the relationship is defined as a match of characteristics. The event may then be modified based on the suggested characteristic. For example, a suggested member may be invited to join the event, or the event's time, location, or name may be changed. If the other event is current or pending, the event and the other event may be combined.

17 Claims, 8 Drawing Sheets

U.S. PATENT DOCUMENTS

| | | | |
|---|---|---|---|
| 2002/0128001 A1* | 9/2002 | Shuttleworth | 455/414 |
| 2005/0164725 A1* | 7/2005 | Naito et al. | 455/517 |
| 2005/0174975 A1 | 8/2005 | Mgrdechian et al. | |
| 2006/0111135 A1* | 5/2006 | Gray et al. | 455/519 |
| 2006/0240856 A1* | 10/2006 | Counts et al. | 455/518 |
| 2006/0270419 A1 | 11/2006 | Crowley et al. | |
| 2007/0049344 A1* | 3/2007 | Van Der Velde et al. | 455/560 |
| 2007/0197247 A1* | 8/2007 | Inselberg | 455/517 |
| 2008/0120410 A1* | 5/2008 | Quoc et al. | 709/225 |
| 2008/0280637 A1* | 11/2008 | Shaffer et al. | 455/519 |

OTHER PUBLICATIONS

U.S. Appl. No. 11/712,855, filed Feb. 28, 2007.
U.S. Appl. No. 11/670,400, filed Feb. 1, 2007.

"Friendster For Your Mobile Phone," Trendcentral, Apr. 19, 2004 (1 page).

"Circle Line: Let Your Cell Phone Keep Tabs on Your Friends," Dodgeball.com (originally published in Time Out NY, Dec. 4-11, 2003, Issue No. 247, p. 174) (2 pages).

"So Happy Together," Dodgeball.com (originally published in Newsweek, May 10, 2004, p. 12) (2 pages).

"Dodgeball Goes Multi-City," CORANTE: Tech News. Filtered Daily.; Many2Many: A Group Weblog on Social Software, Apr. 17, 2004 (1 page).

* cited by examiner

| Member A | Member B | Event Time | Event Location | Event Name | Event Status |
|---|---|---|---|---|---|
| Mike 807 | John 811 | 7:00pm 820 | ... John's Place 830 | Drinks 840 | Current 853 | 862
| John 808 | Matt 812 | Friday, 8:00pm-9:30pm 821 | ... | Poker 841 | Pending 854 | 863
| John 809 | Mike 813 | Wednesday, 5:00pm-7:30pm 822 | ... | Book-Club 842 | Past 855 | 864
| John 810 | Matt 814 | 7:00pm 823 | ... John's Place 831 | Drinks 843 | Current 856 | 865
| Mike 811 | Matt 814 | 7:00pm 824 | ... John's Place 832 | Drinks 844 | Current 857 | 866

*FIG. 8*

EMPLOYING MATCHING OF EVENT CHARACTERISTICS TO SUGGEST ANOTHER CHARACTERISTIC OF AN EVENT

TECHNICAL FIELD

The present invention relates generally to mobile communications and, more particularly, but not exclusively to determining a suggested characteristic, including a suggested member for an event based on matching of event characteristics.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, and enabling us to form partnerships with more people in more ways than ever before.

One aspect of our everyday lives that may benefit from online social networking technology involves the aspect that social gatherings may often occur in a less than organized, impromptu fashion. For example, people may decide, online to get together at some restaurant, club, or the like, almost immediately. Some social gatherings, while known by some members of a social network may be unknown by others, until so informed that the social event is presenting, occurring, or is about to occur.

People may wish to create these social gatherings and/or to invite others to join these social gatherings. However, the creation and invitation process may be cumbersome due to current technology. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 shows one embodiment of a datastore for storing event characteristics.

DETAILED DESCRIPTION

Figure 1:
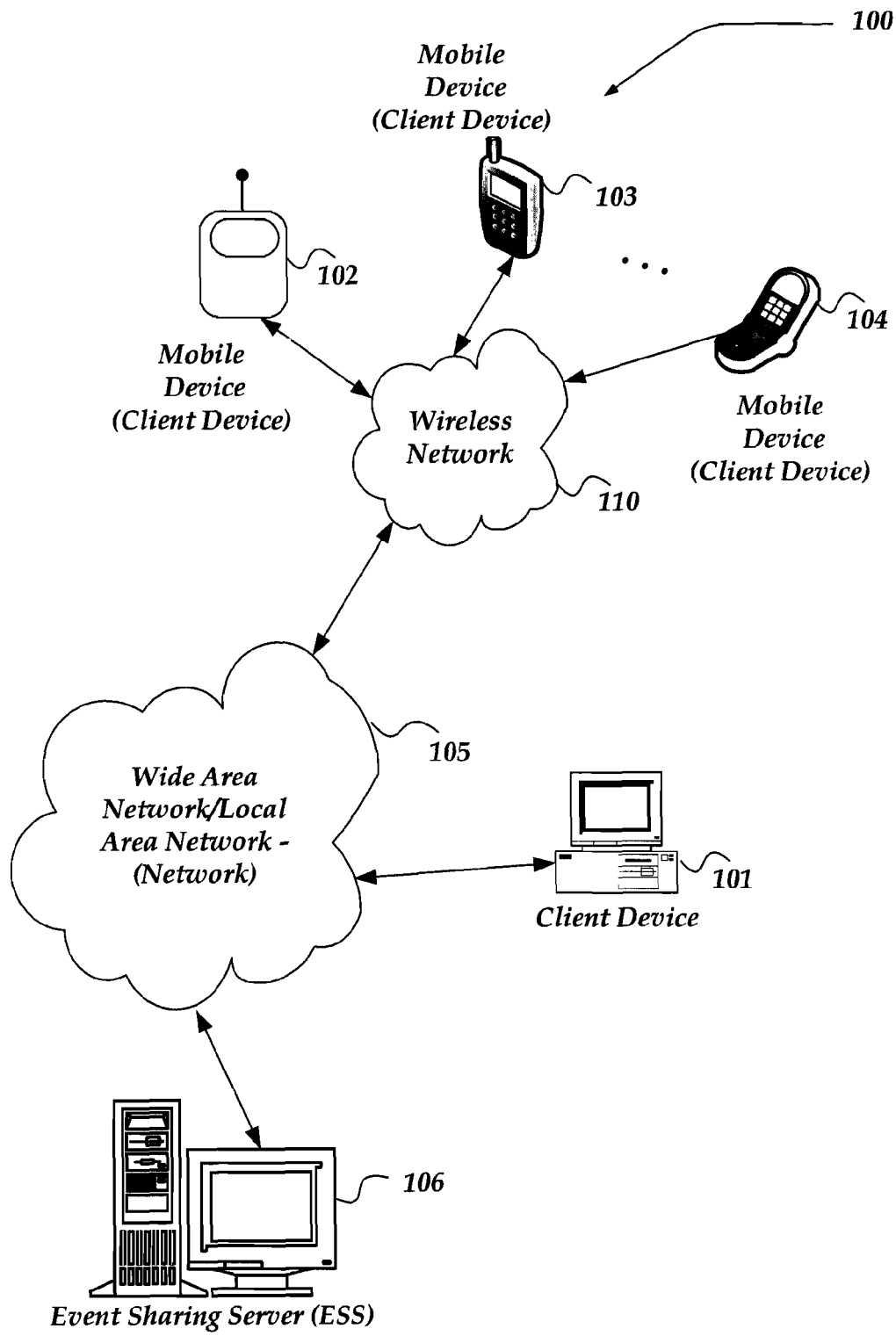
FIG. 1 shows components of an environment in which one or more embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, a social event, such as a party, meeting event, or the like.

As used herein, the term "event" refers to any physical social gathering of people, having a start time and an end time. In one embodiment, the start, and/or end times may be loosely established, in that they may occur informally, such as might arise based on an informal gathering of people. In another embodiment, the event may have established start and/or end times. Moreover, in one embodiment, the event may have multiple start/end times, such as might occur with a regularly scheduled meeting, or the like. As used herein the terms "event characteristic" or simply "characteristic" refer to any information associated with an event, including the event's time of creation, the event's duration, the event's location, the event's name, an amount of communication by a member, a time a member joined the event, or the like.

As used herein, the term "member" refers to a person or entity who is included in any collection. The term "group" refers to a collection of members who are participating in an event. As such the term "member of an event" refers to a member of a group associated with the event.

The term "content" refers to any digital data directed towards a user of a computing device, including, but not limited to audio data, multimedia data, photographs, video data, still images, text, graphics, animation files, voice messages, text messages, or the like.

The terms "ID," "user ID," and "identity" refer to any information useable in identifying a member, including an alphanumeric string, picture, sound, movie clip, or the like.

Briefly stated the various embodiments are directed towards determining a suggested characteristic for an event. At least two events are determined. In one embodiment, at least one characteristic is determined for one of the event. A plurality of other characteristics is determined for the other event. The characteristics of the two events may be determined implicitly from communications during the events or from user input. Based on a relationship between the determined characteristics, a suggested characteristic for the event is then determined. In one embodiment, the relationship is defined as a match of characteristics.

The event may then be modified based on the suggested characteristic. For example, a suggested member may be invited to join the event, or the event's time, location, or name might be changed based on the suggested characteristic. If the other event is current or pending, the event and the other event may be combined. For example, members of one event may be invited to join the other event.

Illustrative Operating Environment

FIG. 1 shows components of an environment in which one or more embodiments of the invention may be practiced. Not all the components may be required to practice the invention, and variations in the arrangement and type of the components may be made without departing from the spirit or scope of the invention. As shown, system 100 of FIG. 1 includes local area network ("LAN")/wide area network ("WAN")—(network) 105, wireless network 110, Event Sharing Server (ESS) 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to ESS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as ESS 106, client device 101, each other, or the like. However, the present invention is not limited to these message protocols, and virtually any other message protocol may be employed. For example, the client application may enable a user to interact with the browser application, email application, VoIP applications, or the like.

Mobile devices 102-104 may further be configured to include a client application that enables the end-user to log into an end-user account that may be managed by another computing device, such as ESS 106. Such end-user account, for example, may be configured to enable the end-user to receive emails, send/receive IM messages, SMS messages, access selected web pages, participate in a social networking event, or the like. However, participation in various social networking events may also be performed without logging into the end-user account.

In addition, mobile devices 102-104 may include another application that is configured to enable the mobile user to share and/or receive content, and to display the content. In one embodiment, each of mobile devices 102-104 may share with and/or receive the content from ESS 106 and/or from another one of mobile devices 102-104. For example, content may be shared between the mobile devices using MMS, WAP, or the like. In one embodiment, a mobile device may receive a message indicating the content is available for viewing and/or annotating at a website, or the like.

In conjunction with sharing content, mobile devices 102-104 may enable an interaction with each other, through sharing various messages, and generally participating in a variety of integrated social experiences beyond merely voice communications. In one embodiment, mobile devices 102-104 may enable the interaction with a user associated with an event. For example, a user of one of mobile devices 102-104 may create a group that includes identified members. In one embodiment, members of the group may elect to share content, such as photographs, video clips, audio clips, text messages, emails, or the like, with other members of the group. Moreover, mobile devices 102-104 may enable any of the members of the group to also add other members to the group. In one embodiment, mobile devices 102-104 may send a message to the members associated with an event.

Mobile devices 102-104 may also communicate with non-mobile client devices, such as client device 101, or the like. In one embodiment, such communications may include providing information about the content to a user of client device 101, or the like.

Client device 101 may include virtually any computing device capable of communicating over a network to send and receive information, including social networking information, or the like. Generally, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared content, and to annotate the content, add additional content, or the like. Similar to mobile devices 102-104, client device 101 may be configured to send and receive a message which includes a recipient list or a selectable option to retrieve the recipient list.

Figure 6:
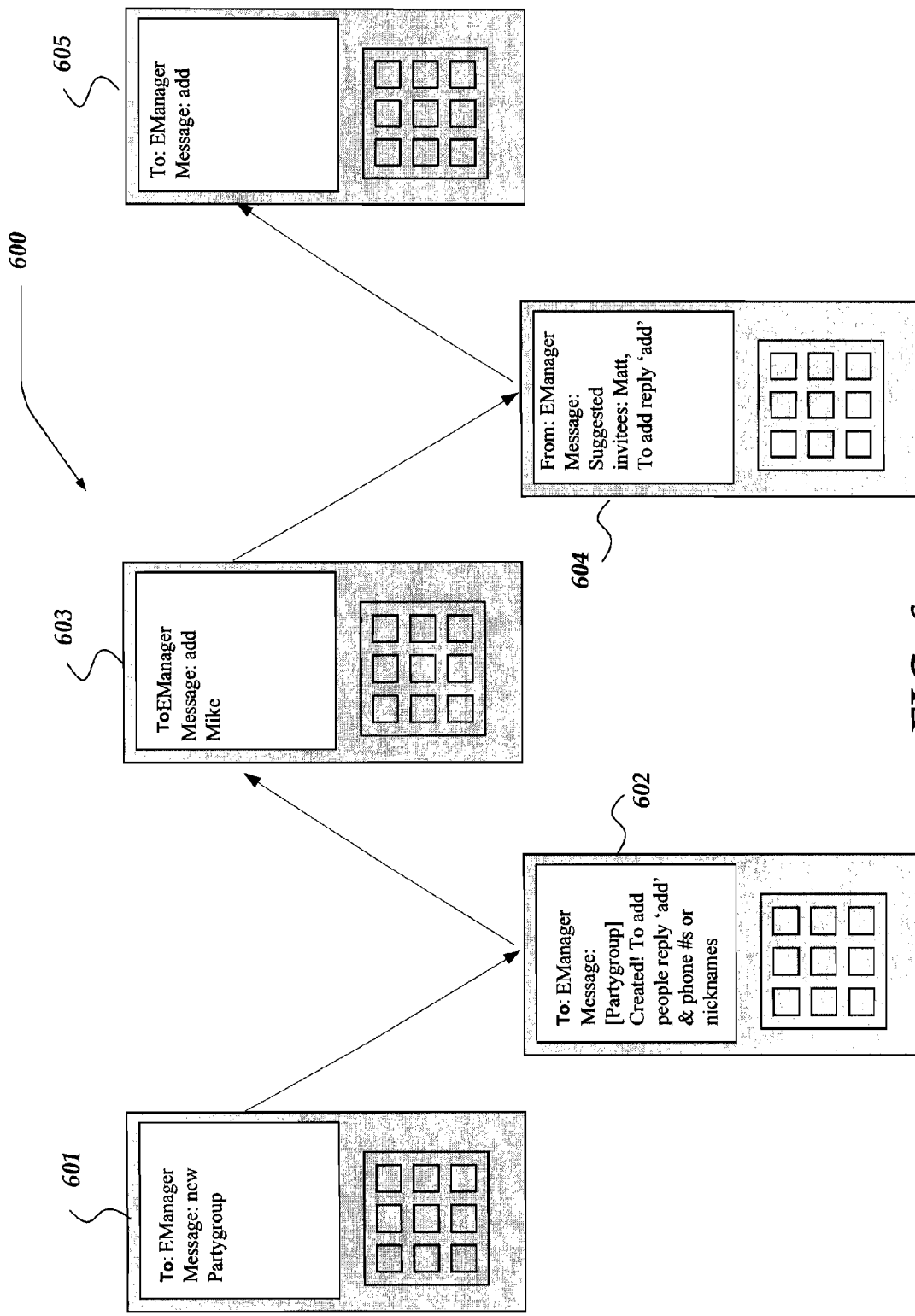
FIG. 6 shows one embodiment of a use case for providing a suggested member for an event based on characteristics of other events.
Figure 7:
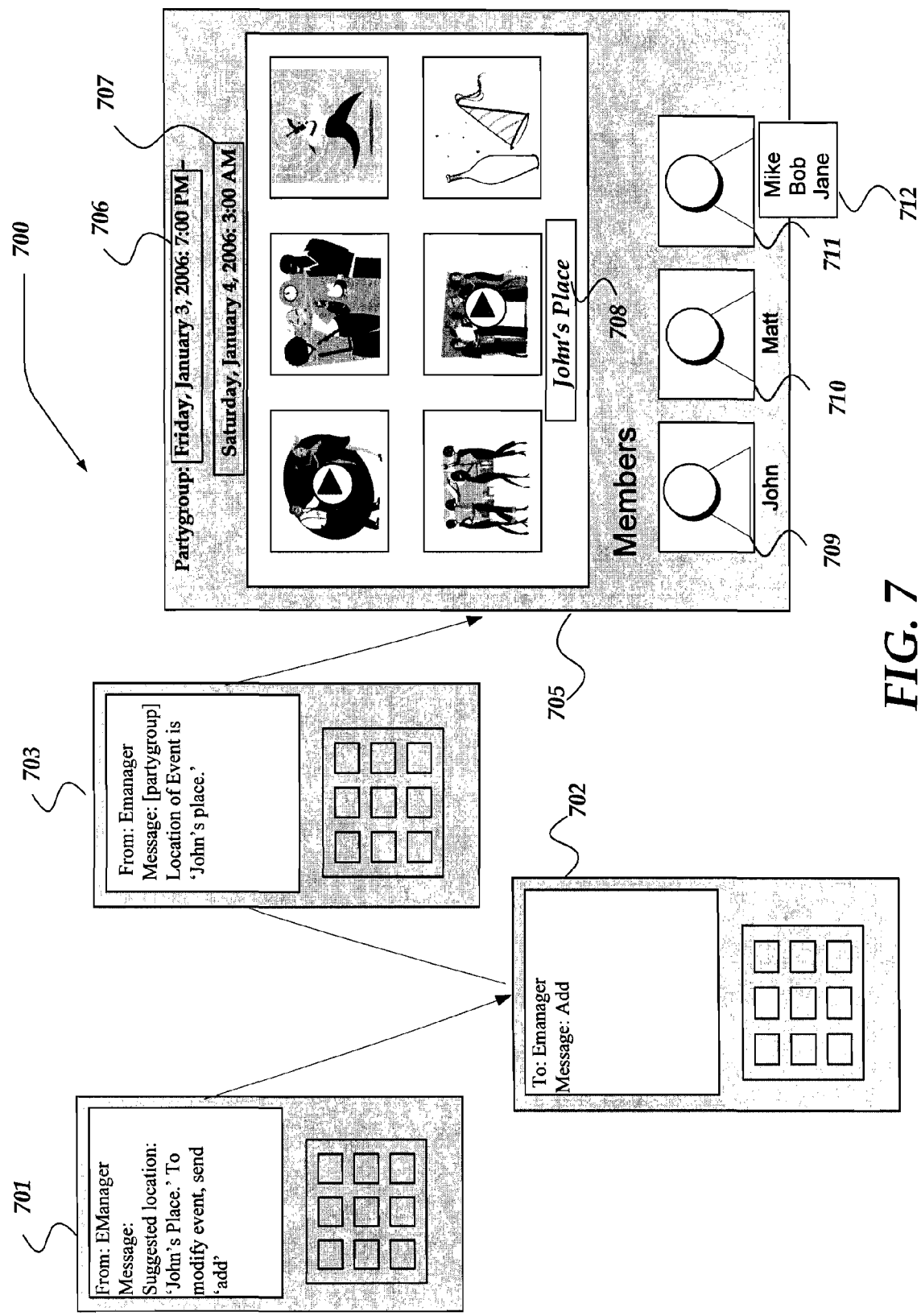
FIG. 7 shows one embodiment of another use case for providing a suggested location for an event based on characteristics of other events.

In one embodiment, client devices 101-104 may enable a user of the devices to receive a suggested characteristic of an event, to provide or change event characteristics of the event, or the like. FIGS. 6-7 below include one embodiment of examples of providing and changing event characteristics based on suggested event characteristics.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple ESS 106 and its components with other computing devices, including, mobile devices 102-104, client device 101, and through wireless network 10 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between ESS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ESS 106 is described in more detail below in conjunction with FIG. 3. Briefly, however, ESS 106 may include any computing device capable of connecting to network 105 to enable determination (e.g., creation and/or modification) of a user's social network based on event characteristics.

ESS 106 may be configured to create an event group and to share content with the members of the group. ESS 106 may receive from various participants in the event, content, and other social networking information, including information associated with event, messages, or the like. ESS 106 may then employ any of a variety of communication services to enable the messages to be shared between the members of the group. Moreover, ESS 106 may enable a website or other location for storage and access of at least some of the shared messages. ESS 106 further enables members of the group to add more members to the group, even if the member adding is not the original creator of the group. In one embodiment, ESS 106 may send an initiation to one of client devices 101-104 to invite a user associated with the devices to join the event.

ESS 106 may be further configured to determine at least one characteristic for at least one event. The event may include past, present, or future events. ESS 106 may be configured to determine implicit event characteristics, such as a start time, end time, or location of an event based on the sharing of at least one message.

ESS 106 may determine a suggested event characteristic for an event based on a match between characteristics of the event and characteristics of other events. ESS 106 may provide the suggested characteristic to one of client devices 101-104 for further processing. Client devices 101-104 may send a confirmation to ESS 106 to update the event based on the suggested event characteristic. In one embodiment, the suggested event characteristic may be a suggested member for the event. ESS 106 may employ a process similar to that described below in conjunction with FIGS. 4-5 to perform at least some of its actions.

Devices that may operate as ESS 106 include personal computers desktop computers, multiprocessor systems, microprocessor-based or programmable consumer electronics, network PCs, servers, and the like.

Although FIG. 1 illustrates ESS 106 as a single computing device, the invention is not so limited. For example, one or more functions of ESS 106 may be distributed across one or more distinct computing devices. For example, determining associations between group and/or event characteristics, determining recipient lists for shared messages, managing various social networking events, including sharing of content, managing Instant Messaging (IM) session, SMS messages, email messages, posting of content, determining implicit information such as start/end times, locations, or the like for an event, may be performed by a plurality of computing devices, without departing from the scope or spirit of the present invention.

Illustrative Client Environment

Figure 2:
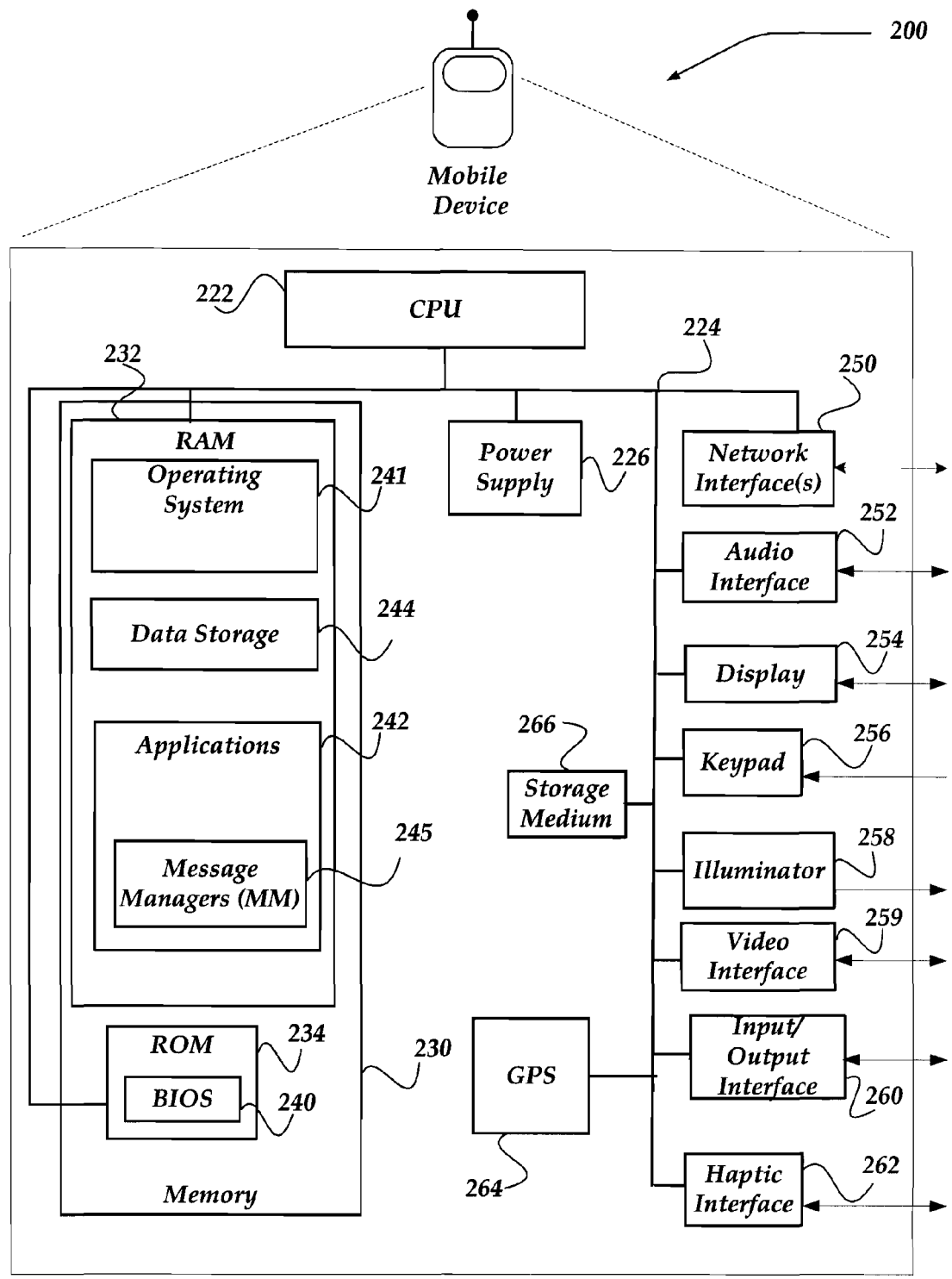
FIG. 2 shows one embodiment of a client device that may be included in a system implementing one or more embodiments of the invention.

FIG. 2 shows one embodiment of a client device that may be included in a system implementing one or more embodiments of the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that can be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store content and/or social networking information including text messages, address books, group member lists, or the like. At least a portion of the content and/or event information may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245.

MM 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MM 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MM 245 may further include an IM application that is configured to initiate and otherwise manage an instant messaging session, including, but not limited to AOL Instant Messenger, Yahoo! Messenger, NET Messenger Server, ICQ, and the like. In one embodiment, the IM application within MM 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other content may be communicated between client device 200 and another networked device.

In any event, any one or more of the messaging applications within MM 245 may be employed to enable a user of client device 200 to create a group with members for an event, to share content, and other messages with members of the group, and to access content or the like, from another networked device, such as a website, server, or the like. In one embodiment, MM 245 may enable a user to send SMS messages, and/or send/receive MMS messages, where the messages may include content, a link to a remote server where the content is stored, or the like. In one embodiment, at least one event characteristic of an event may be sent over network interface 250 using MM 245. In one embodiment, a suggested event characteristic may be received over network interface 250 and displayed by MM 245. In one embodiment, MM 245 may display the (suggested) event characteristics in the browser application, an SMS application, email application, or the like. The (suggested) event characteristic may be used to modify the event. For example, MM 245 may send over network interface 250, a confirmation that the event should be modified to include the (suggested) event characteristic.

Illustrative Server Environment

Figure 3:
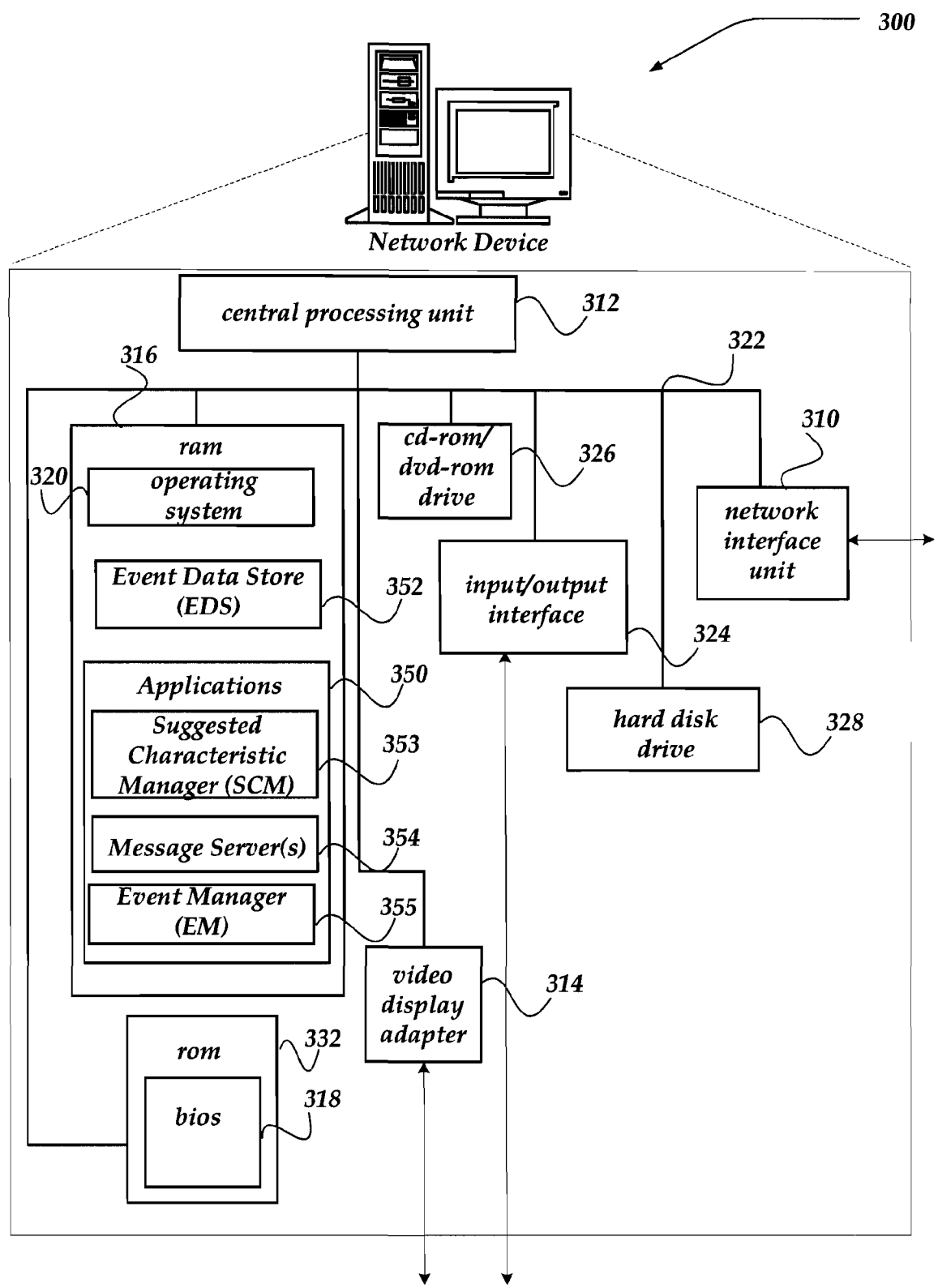
FIG. 3 shows one embodiment of a network device that may be included in a system implementing one or more embodiments of the invention.

FIG. 3 shows one embodiment of a network device that may be included in a system implementing one or more embodiments of the invention. Network device 300 may include many more components than those shown. The components shown, however, are sufficient to disclose an illustrative embodiment for practicing the invention. Network device 300 may represent, for example, ESS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, including XmlHTTPRequest (XHR), Asynchronous JavaScript and XML (AJAX), JavaScript Object Notation (JSON) programs, customizable user interface programs, IPSec applications, encryption programs, security programs, account management, and so forth. Event Manager (EM) 355 and/or Message Servers 354 may also be included as application programs within applications 350.

Event Data Store (EDS) 352 stores a plurality of received content. In one embodiment, EDS 352 may be a database, a file structure, or the like. EDS 352 may store event characteristics, including a time of an event, a location of an event, an amount of activity during the event, content associated with the event, or the like. EDS 352 may store unique IDs for all users associated with an event, or the like. In one embodiment, EDS 352 may store table 800 of FIG. 8.

Message server(s) 354 include virtually any communication server that may be configured to enable communications between networked devices, including email servers, Simple Mail Transfer Protocol (SMTP) servers, Short Message Peer-to-Peer Protocol (SMPP) servers, SMS servers, various text messaging servers, VOIP servers, IM servers, MMS servers, RSS servers, audio servers, web servers, or the like. Message server(s) 354 may employ EDS 352 to store or otherwise manage content that may be communicated over a network. In one embodiment, various message server(s) 354 may receive a message from one network device, and, in conjunction with Event Manager (EM) 355, employ information about group membership to store, and/or share the content to other members over the network. In one embodiment, message server(s) 354, in conjunction with EM 355, store received content for a group, within EDS 352.

EM 355 is configured to manage events. As such, EM 355 may receive from message server(s) 354 a request for creation, deletion, or modification of a group for an event. EM 355 may employ EDS 352, to create and otherwise manage the membership to the group. EM 355 may further employ various message server(s) 354 to send a message to the members of the group indicating that they are a member of the group.

Moreover, EM 355 may be configured to determine at least one characteristic for at least one event. EM 355 may be configured to receive the event characteristics from a user, over network interface unit 310, or the like. While message server(s) 354 may be configured to manage and enable sharing of messages, including messages having content, EM 355 may employ the messages, and related information to determine implicit event characteristics of an event. Thus, EM 355 may determine start times, end times, locations of an event, or the like. EM 355 may store the derived implicit or received event characteristics within an association. EM 355 may also store identities of members with or associated with the characteristics. EM 355 may employ a process similar to that described below in conjunction with FIG. 5 to perform at least some of its actions. Referring briefly to table 800 of FIG. 8, event characteristics 862-866 may include implicitly and/or explicitly determined characteristics.

Suggested Characteristic Manager (SCM) 353 is configured to determine a suggested event characteristic for an event based on a match between characteristics of the event and characteristics of other events. SCM 353 may receive the characteristics of the event and the other event from EM 355 and/or EDS 352. Based on the suggested event characteristic, SCM 353 may modify the event. For example, SCM 353 may modify a field associated with the event in EDS 352, or the like.

Generalized Operation

Figure 4:
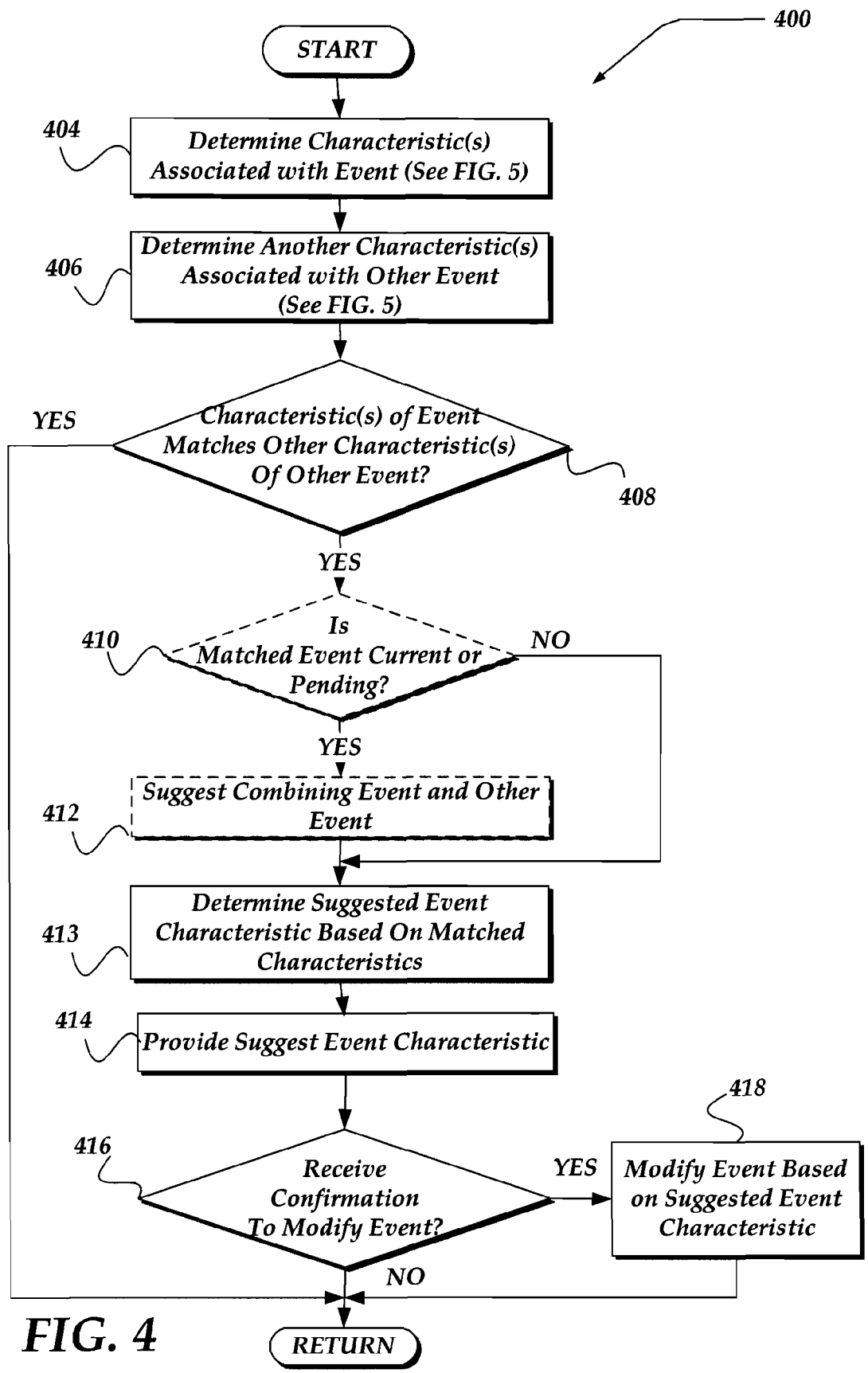
FIG. 4 illustrates a logical flow diagram generally showing one embodiment of a process for determining a suggested characteristic for an event based on other characteristics of other events.
Figure 5:
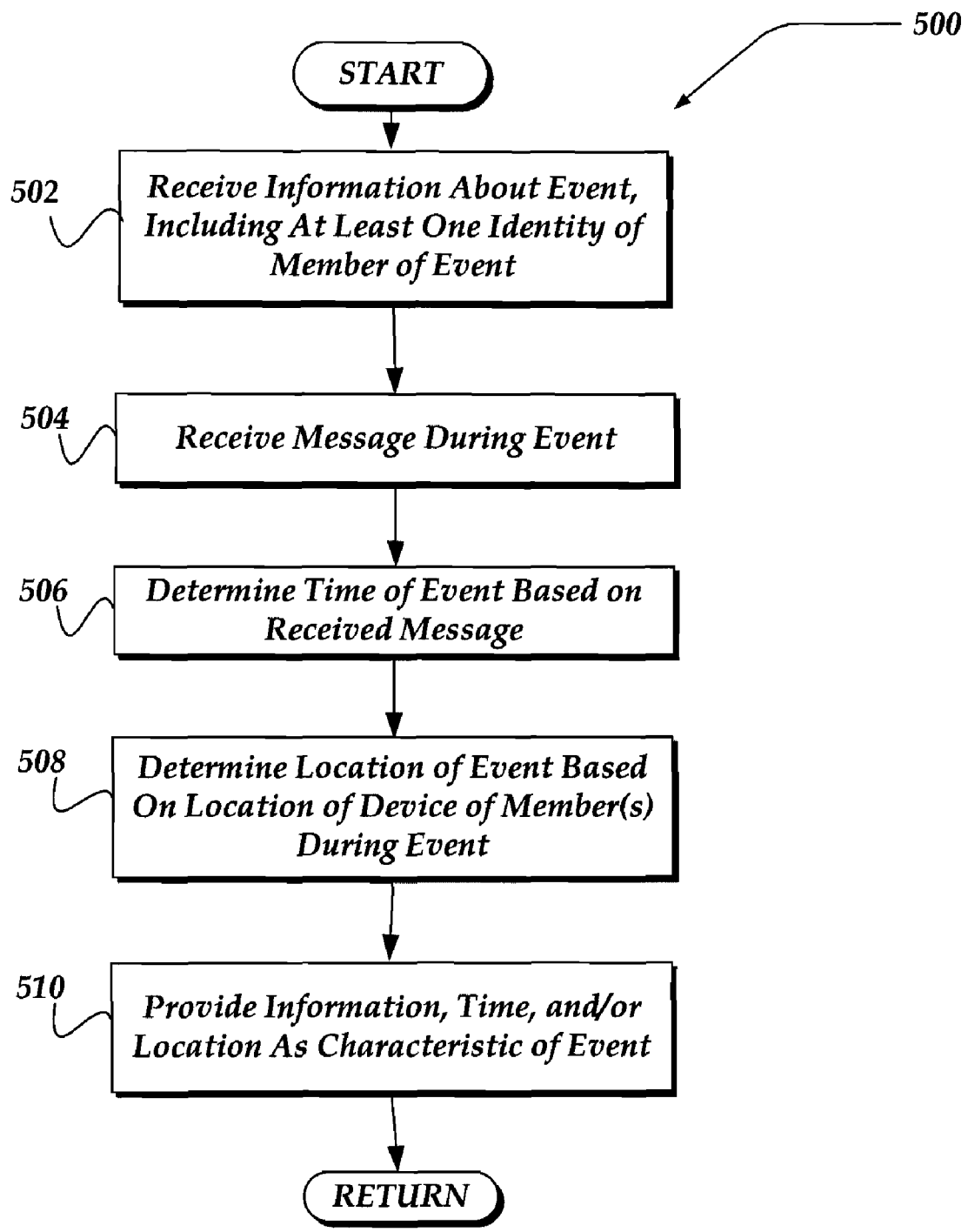
FIG. 5 illustrates a logical flow diagram generally showing one embodiment of a process for determining event characteristics.

The operation of certain aspects of the invention will now be described with respect to FIGS. 4-5. FIGS. 4-5 provide logical flow diagrams of certain aspects, while FIGS. 6-7 provide use case examples to further illustrate the invention.

FIG. 4 illustrates a logical flow diagram generally showing one embodiment of a process for determining a suggested characteristic for an event based on characteristics of other events. Process 400 may also be performed by ESS 106 of FIG. 1.

Process 400 begins, after a start block, at block 404, where characteristics of an event is determined. One embodiment of a process for performing block 404 is described in conjunction with FIG. 5. Briefly, however, at block 404, the characteristics may be determined based on a user configuration of the event or implicitly, from information communicated during the event or a location of a device of a member during the event.

In one embodiment, the characteristics include identities of one or more members. For example, an event A may be named "Drinking," may include the members "Bob" and "John" and may be scheduled or determined to start at 7:15 pm, and may be located at Bob's place. Thus, for the event A, the characteristics are (Members: Bob, John, Time: 7:15 pm, Location: Bob's place). In any case, processing next flows to block 406.

At block 406, another characteristics of another event is determined. In one embodiment, the process for determining the other characteristics is described in more detail in conjunction with FIG. 5. The other event may be a past event occurring before the event, a present or current event occurring concurrently with the event, or a pending/future event scheduled to occur after a current time or after the event.

Referring briefly to FIG. 8, table 800 of FIG. 8 shows examples of characteristics of the other event. For example, characteristics 862-865 include an identity of member A and member B, an event time, an event location and an event name. Each of the characteristics 862-865 are also associated with an event status (e.g., current, pending, past). As shown, member A and member B may represent at least two members of an event described by the characteristics. As shown, more than one row of datastore may include information for the same event (e.g., rows 862 and 865 for the event named "Drinks"). Although datastore 800 shows one representation of a storage of characteristics of events, the information may be stored in any way without departing from the scope of the invention. For example, the information may be stored as a single list of characteristics, associated with a plurality of members, or the like.

Referring back to process 400, processing next flows to decision block 408. At decision block 408, it is determined whether the characteristics of the event matches the other characteristics of the other event. A particular characteristic matches another particular characteristic if the two characteristics are a partial match, an exact match, within a range of each other, or another substantial match of each other, or the like. In one embodiment, where the particular event characteristic is an identity of a member of the events, a member of the event may match another member of the other event if the members are the same members. In another embodiment, the event characteristics may match if the member of the event is in a social network community with the other member of the other event. In any case, a match may be determined to exist between the characteristics and the other characteristics if at least one of the characteristics of the event matches at least one of the other characteristics of the other event. In one embodiment, a match threshold may be used, and a match is determined to exist if the number of matching characteristics is equal to or exceeds the threshold.

Referring briefly to datastore 800 of FIG. 8, each row of rows 862-865 is associated with a pair of members for a particular event. At least one member of the event A may match one member of rows 862-865. For example, the members John may match member John in rows 863-865. Moreover, the event A's time of 7:15 pm may match event times 820, 822, 823, and

824. Moreover, event A's name of "Drinking" may match event names 840, 843, and 844: "Drinks" based on string matching or other information retrieval techniques. For example, the string "Drinking" may be canonicalized, capitalized, stemmed, stop word removed, or the like, before matching. "Drinking" may be stemmed to "Drink" and matched with "Drinks" based on a partial string match.

Referring back to process 400, if it is determined that the characteristics of the event matches the characteristics of the other event, then processing continues to decision block 410. Otherwise, processing returns to a calling process for other processing.

As shown, blocks 410 and 412 are optional. In one embodiment, blocks 410 and 412 may not be performed, and processing may continue from decision block 408 to block 413.

In one embodiment, at decision block 410, it is determined whether the other event is a currently ongoing event or a pending/future event. In one embodiment, the time of the other event may be compared to a current time, a start and/or end time of the event, or the like. If the time of the other event is within a time-window (e.g., 15-30 minutes) of the current time and/or time of the event, then the event is determined to be a currently ongoing event. If the time of the other event is a time in the future of the current time and/or time of the event, then the event is determined to be a pending/future event. In another embodiment, a status of the other event may be stored in a table field, or the like, associated with the event, such as in fields 853-857 of FIG. 8. The status may be used to determine whether the other event is a current or pending event. In any case, if the other event is a current or pending event, then processing continues to block 412. Otherwise, processing continues to block 413.

At block 412, a suggestion to combine the event and the other event may be sent to a user. In one embodiment, the user is an owner of the event (e.g., a member who created the event). In one embodiment, the suggestion may be sent to a client device associated with the user, such as mobile device 104 of FIG. 1. The suggestion may include the name of the other event, the characteristic of the other event, an identity of a member who created the other event, the identities of members of the other event or the like. The suggestion may be any mechanism, including a web page, an email, an IM message, an SMS message or the like. The suggestion may enable the user to respond over any mechanism, including over HTTP, email, IM, SMS, or the like. In one embodiment, the suggestion may enable the user to move the members of the event to the other event, change the characteristics of the other event based at least in part on the characteristic of the event, send a request to an owner of the other event to combine the event and the other event, or the like. In one embodiment, the suggestion may enable a pop-up in a web page, an HTML section in a web page, a dynamic HTML change of a web page (e.g., using JSON, AJAX), or the like, to enable the user to combine the event and the other event. Processing then continues to block 413.

At block 413, a suggested characteristic for the event is determined based on a match between at least one characteristic of the characteristics and at least another characteristic of the other characteristics. The match may be determined, for example, at decision block 408. In one embodiment, the suggested characteristic may be an identity of a suggested member for the event, an event time, an event location, an event name, or the like. In one embodiment, the suggested characteristic may be one of the other characteristics that was not matched. For example, referring to table 800 of FIG. 8, event A may match rows 862-866. While member "John" may be members of rows 862-866, members "Matt" and "Mike" are not members of event A and thus are determined as suggested members. For row 863, a suggested time may be determined as "Friday 8:00 pm-9:30 pm" because this time does not match event A's time. Similarly, an event name and an event location may be suggested based on information in table 800. Processing then continues to block 414.

At block 414, the determined suggested event may be provided to the user. In one embodiment, the suggested event characteristic may be sent to a client device associated with the user. The suggested event characteristic may be sent over any protocol, channel, mechanism or the like, including HTML/HTTP, SMS, IM, or the like. The suggested event characteristic may include a suggested member for the event, a suggested name, a suggested location, a suggested time, or the like. The suggested event characteristic may also include other identifying information to aid the user in deciding whether to use the suggested event characteristic to modify the event. The other identifying information may include the name of the other event, the name of the owner of the other event, or the like. In one embodiment, the suggested event characteristic may enable a pop-up in a web page, an HTML section in a web page, a dynamic HTML change of a web page (e.g., using JSON, AJAX), or the like, to enable the user to confirm the modification of the event based on the suggested event characteristic. For example, as the user is entering, modifying, or updating the characteristic of an event using a web page form, a field associated with a type of event characteristic may present a popup-list, or the like, which may include the suggested event characteristic. Selecting the suggested event characteristic from the popup-list, may enable sending a confirmation to modify the event.

At decision block 416, it is determined whether the confirmation to modify the event based on the suggested event characteristic is received. In one embodiment, the confirmation may be received from the user, a device associated with the user, from a third party (e.g., another member of the event) enabled by the user to modify the event, or the like. In one embodiment, the user may send to another member (or to all members) of the event, the suggested event characteristic to enable at least one of the other members to modify the event based on the suggested event characteristic. The other members may respond using any mechanism, including responding with the confirmation, a vote to modify the event, or the like. The confirmation may be sent over any protocol, channel, mechanism or the like, including HTML/HTTP, SMS, IM, or the like. The confirmation may include the suggested event characteristic, security information identifying the sender, or the like. If the confirmation is received, the processing continues to block 418. Otherwise, processing returns to a calling process for further processing.

At block 418, the event is modified based on the suggested event characteristic, including a suggested member. In one embodiment, a suggested member may be added to the event. In one embodiment, a field of the event, such as a member list, database field, or the like, may be modified based on the suggested event characteristic. For example, the suggested member may be added to the list of members of the event. In one embodiment, an invitation to join the event may be sent to suggested member. The suggested member may send a response to add the suggested member to the event. Processing then returns to a calling process for further processing.

In an alternate embodiment, process 400 may operate on a plurality of event characteristics. In this embodiment, a plurality of event characteristics may be determined at block 404 and at block 406. The pluralities of event characteristics may be determined to match at block 408. In another embodiment, a plurality of suggested event characteristic may be determined at block 413 and suggested to a user at block 414. At block 418, the event may be modified based on the plurality of suggested event characteristic. In one embodiment, the plurality of suggested event characteristic may be of different types. For example, a suggested member and a suggested location may be concurrently provided to the user at block 414. In another embodiment, the plurality of suggested event characteristics may be of the same type. For example, a plurality of suggested members may be provided to the user at block 414.

In another alternate embodiment, the plurality of suggested event characteristics may be ordered. Ordering the plurality of suggested characteristics (either of the same of different types) may be based on a number of matching characteristics between the event and the other event/events for each suggested event characteristic. For example, member "Mike" is a member of event B. Referring to table 800 of FIG. 8, member "Mike" and member "John" are members of event "Drinks" and another event "Book-Club", and member "Mike" and member "Matt" are members of event "Drinks." In this example, the pair of members ("Mike", "John") matches both events "Drinks" and "Book-Club." Accordingly, the number of matching characteristics between event B and the events in table 8 is two. For the pair ("Mike", "Matt") the number of matching characteristics is one. Because member "John" is associated with a higher number of matching characteristics, member "John" is placed higher in the plurality of suggested event characteristics, followed by the member "Matt." In any case, the ordered plurality of suggested event characteristics is provided to the user at block 414.

In yet another alternate embodiment, process 400 may be performed substantially in real-time and/or the blocks of process 400 may be performed substantially concurrently. For example, the user may create an event using a web page. The user may enter an event characteristic, for example, in a field of a web page. The event characteristic may be partially or completely entered. In one embodiment, as the user types in the event characteristic, the partially or completely entered event characteristic is sent to a server, using for example, JSON, AJAX, XML, or the like. The entered event characteristic may be used to determine the event characteristic at block 404. Concurrently with receiving other parts of the event characteristic and determining the event characteristic at block 404, other blocks of process 400 may be performed. For example, a suggested event characteristic for the same event characteristic being entered by the user and/or a different event characteristic may determined at block 413 and may be sent to the user at block 414. Thus, the user may receive the suggested event characteristic as a suggested text-completion for the event characteristic of the field the user is currently entering and/or a suggested characteristic for a different event characteristic of a different field. The user may decide to accept the received suggested event characteristic. For example, the user may click a submit button, click on the text-completion, or the like, to enable sending a confirmation to modify the event based on the suggested event characteristic. Processing then continues to block 416, as described above.

In one embodiment, process 400 may be enabled to be performed by a user input. For example, on a client device, a user may create the event. In response, block 404 may then be performed.

In another embodiment, at least some blocks of process 400 may be automatically performed without user input. For example, at least some of the blocks may be performed based on a timer trigger, or other internally generated trigger, or the like. In one embodiment, a sever such as ESS 106 of FIG. 1 may automatically trigger at least some of the blocks to be performed. In another embodiment, a client device may automatically send a message to the server to perform at least some of the blocks. In any case, in one embodiment, blocks 404 and 406, and/or 408 and 413 may automatically be performed, thus enabling an automatic determination of a suggested characteristic. In another embodiment, at block 416, a confirmation may be received from another process, or the like, and not from a user. Alternately, blocks 414 and 416 may be optional and may not be performed.

FIG. 5 illustrates a logical flow diagram generally showing one embodiment of a process for determining event characteristics either implicitly or explicitly. Process 500 may also be performed by ESS 106 of FIG. 1. In one embodiment, process 500 may represent actions performed in blocks 404 and/or blocks 406 of FIG. 4.

Process 500 begins, after a start block, at block 502, where information about an event is received. In one embodiment, the received information may include at least one identity of one member of the event, an event name, an event location, an event time, or the like. The received information may be sent by an owner of the event, stored in a database, or other datastore, or the like. Processing then continues to block 504.

At block 504, a message is received during the event. The message may be sent by a member of the event, and/or may be sent to another (including all members) of the event. The message may be a text message, media content message, or the like. The message may identify the event, (e.g., by an event ID, or the like). Processing next continues to block 506.

At block 506, a time of the event is determined based on the received message. In one embodiment, the start and/or end time may be determined by a rate of flow of received messages. For example, in one embodiment, when the flow rate of messages exceeds some threshold value, such as two/minute, five/minute, or the like, then it might be determined that the event has started. However, it should be clear that other values may also be selected, without departing from the scope of the invention. Moreover, in one embodiment, the start time may also be determined based, for example, on receiving a first message. Similarly, the end time may also be inferred from the flow rate of messages. Thus, in one embodiment, when the flow rate of messages drops below another threshold value, that time, might be determined to be the end time for the event.

At block 508, a location of the event may be determined based on a physical location of a client device (e.g., mobile device) associated with at least one member of the event during the event. For example, a GPS coordinate, IP address, street-address (e.g., entered by the member), or the like may be received from the client device, concurrently with messages being sent to members of the event. The received information may be a location, may be used to identify a location (e.g., through a lookup of a street address based on a GPS coordinate), or the like.

In another embodiment, if it is determined that several of the mobile devices sharing messages are within some determined distance apart, then those locations may be used to determine a location of the event. Thus, in one embodiment, a location central to the locations of the mobile devices may be used to determine the event location. In another embodiment, the locations of the mobile devices may be used to search a data store, such as a merchant directory, white pages, maps, or the like, to identify a facility, business, park, theater, home, or the like. The location of the facility may then be employed to identify a location of the event. However, the invention is not limited to these techniques to determine a location of the event, and virtually any other mechanism may be employed. For example, in one embodiment, the shared messages may be searched for keywords that might indicate a location. Processing next continues to block 510.

At block 510, the received information, determined time and/or determined location may be provided as at least one characteristic of the event. The at least one characteristic may be provided to another process, or the like, for further processing. For example, the at least one characteristic may be used by blocks 404 and/or 406 of FIG. 4. Processing then returns to a calling process for further processing.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Cases

FIG. 6 shows one embodiment of a use case for providing a suggested member for an event based on characteristics of other events. Interface 601 of example 600 illustrates that, in one embodiment, a message to create an event may be sent to an event sharing server (ESS) such as ESS 106 of FIG. 1, or the like. The message may, in one embodiment, employ SMS, however, the invention is not so limited, and any of a variety of communication message services may also be employed. As shown, at interface 601, the user may request a "new" event to be created by the name "partygroup." The user may then be added to the "partygroup" event. After receiving the request to create the event, the ESS may determine at least one event characteristic. The ESS may also determine that the user (e.g., "John") is a member of the group associated with event.

At interface 602, the user receives an instruction on how to add other members to the group associated with the event.

At interface 603, the user adds member associated with the identifier "Mike." Although shown as a name, the member "Mike" may be identified with a phone number such as "4155551234." After receiving the request to add the members, the ESS may determine suggested members and/or other suggested event characteristics, using for example, process 400 of FIG. 4.

At interface 604, the user receives a message from the ESS, suggesting the suggested member "Matt." Although shown as a name, the member "Matt" may be identified with a phone number such as "4155552234." The user is instructed to send the response "add" to add "Matt" to the event. Interface 605 shows the message "add" being sent by the user to add the suggested member "Matt" to the event.

FIG. 7 shows one embodiment of another use case for providing a suggested location for an event based on characteristics of other events. Example 700 of FIG. 7 is a continuation of example 600 of FIG. 6.

Interface 701 shows another suggested characteristic of the event being received by the user. The suggested characteristic may be based on the current characteristic, including the identities of the members of the event. The suggested characteristic may be determined by, for example, process 400 of FIG. 4. As shown, the suggested location "John's place" is sent to the user. The user is instructed to send the message "add" to modify the event with the appropriate location. At interface 702, the user sends the message "add" to modify the event. Accordingly, at interface 703, a message is received to confirm that the location of the current event has been modified to be "John's place."

Interface 705 shows another user interface for providing the event characteristics, receiving suggested event characteristics, enabling changing the event characteristics, and displaying a confirmation of the changed event characteristics, or the like. As shown, interface 705 provides richer content than interface 703. In one embodiment, interface 705 may be a web page, or the like, displayed on a client device, or the like. Interface 703 may provide event time text entry boxes 706-707, location text entry box 708, and members 709-711. As shown, interface 705 may be populated by the process embodied in interface 701-703. However, interface 705 may be populated by other mechanisms, including by input received at a web page, XML input, or the like. In any case, interface 705 shows the event characteristics for the event in event time text entry boxes 706-707, location text entry box 708, and members 709-711. As the user modifies and/or enters new information in at least one of these components, the other components may provide suggested characteristics. For example, as the user changes the location name in location text entry box 708, a new member may dynamically be suggested in suggested member list 712, as a pop-up list, or the like. The process for providing the suggested characteristic is described in process 400 of FIG. 4.

Illustrative Data Structure

FIG. 8 shows one embodiment of a datastore for storing event characteristics. Table 800 may be stored in EDS 352 of FIG. 3. Table 800 may be used to match against a current event characteristics and to provide suggested event characteristics and/or ordering information, as described in process 400 of FIG. 4, for example. Table 800 may be populated by process 500 of FIG. 5.

As shown, each one of rows 860-866 include a member A and member B field, an event status field, and a plurality of event characteristic fields, including an event time field, event location name field, and an event name field. At least some fields may be empty. An empty field may represent a field that matches any value.

As shown, an event may have several rows in table 800. For example, the event "Drinks" has three entries in table 800. Also, each row of rows 860-866 includes a pair of members—member A and member B, for each of the associated event. However, each row may include more or less members without departing from the scope of the invention.

Table 800 may include many more fields than those shown. For example, table 800 may include other event characteristic fields, including a priority of an event, a status of the event as public or private, a type o the event, or the like. The fields shown, however, are sufficient to disclose an illustrative embodiment for practicing the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for managing a communication over a network, comprising:
    determining a plurality of characteristics of an event, wherein the plurality of characteristics includes an identity of at least one member of the event;
    determining another plurality of characteristics of another event, wherein the other plurality of characteristics includes another identity of at least one other member of the other event;
    determining a suggested characteristic for the event based on at least a relationship between at least one characteristic of the plurality of characteristics and at least another characteristic of the other plurality of characteristics; and
    modifying the event based on the suggested characteristic, wherein modifying the event does not include an ordering of a recipient list for at least one message regarding the event based on the suggested characteristics; and combining the event and the other events, if a time associated with the other event occurs after or concurrently with a time associated with the event.

2. The method of claim 1, wherein the suggested characteristic is yet another identity of at least another one of the other members, and wherein modifying comprises adding the at least other one of the other members to the event.

3. The method of claim 1, wherein modifying the event includes modifying at least one of an event time, an event location, or an event name of the event.

4. The method of claim 1, wherein the match includes determining whether a first member of the at least one member of the event is in a social network community with a second member of the at least one other member of the other event.

5. A network device to manage a communication over a network, comprising:
    a transceiver to send and receive data over the network; and
    a processor that is operative to perform actions, comprising:
        determining at least one characteristic of an event;
        determining a plurality of characteristics of another event;
        determining a suggested characteristic for the event based on at least a relationship between the at least one characteristic and one of the plurality of characteristics of the other event;
        modifying the event based on the suggested characteristic without modifying an ordering of a recipient list for at least one message regarding the event based on the suggested characteristics; and combining the event and the other events, if a time associated with the other event occurs after or concurrently with a time associated with the event.

6. The network device of claim 5, wherein determining the plurality of characteristics of the other event comprises:
    determining a start time and an end time associated with the other event as at least a part of the plurality of characteristics, based on receiving a message communicated between members of the other event, during the other event.

7. The network device of claim 5, wherein determining the plurality of characteristics of the other event comprises:
    determining a physical location of the other event as at least a part of the plurality of characteristics, based on a location of a device associated with a member during the event, or from data within at least one message communicated during the other event.

8. The network device of claim 5, wherein the match includes a partial match of matched characteristics, an exact match of the matched characteristics, a determination whether the matched characteristics are within a range of each other.

9. The network device of claim 5, wherein modifying the event further comprises:
    moving at least one member of either one of the event or the other event to the other one of the event or the other event.

10. The network device of claim 5, wherein modifying the event further comprises:
    modifying either one of the event or the other event with a characteristic of the other one of the event or the other event.

11. A system for managing a communication over a network, comprising:
    a server device operable to perform actions comprising:
        determining at least one characteristic of an event;
        determining a plurality of characteristics of another event, wherein the other plurality includes another identity of at least one other member of the other event;
        determining a suggested member for the event based on at least a relationship between the at least one characteristic and one of the plurality of characteristics; and
        sending an invitation to a client device associated with the suggested member to join the event, wherein the invitation to the suggested member does not include ordering of a recipient list regarding the event, and the client device is in communication with the server device and operable to perform actions comprising:
            receiving the invitation to join the event;
            sending a response to add the suggested member to the event; and combining the event and the other events, if a time associated with the other event occurs after or concurrently with a time associated with the event.

12. The system of claim 11, wherein the client device is a mobile device.

13. The system of claim 11, wherein the server is further operable to perform actions comprising:
    determining a suggested characteristic for the event based on another match between the at least one characteristic and one of the plurality of characteristics; and
    modifying the event based on the suggested characteristic.

14. The system of claim 11, wherein modifying the event further comprises:
    sending to a device associated with a creator of the event, a confirmation request to modify the event based on the suggested characteristic; and
    modifying the event based on the suggested characteristic if the confirmation request is received.

15. A processor readable storage medium having processor executable instructions thereon for managing a communication over a network, the processor executable instructions configured to enable a processor to perform actions, comprising:
    receiving a plurality of suggested characteristics, wherein at least one of the plurality is based on at least a relationship between at least one characteristic of an event and one of a plurality of other characteristics of another event;

enabling selecting the at least one of the plurality of suggested characteristics;

sending a confirmation to modify the event based on the selected at least one of the plurality of suggested characteristics, wherein the modification does not include ordering of a recipient list for at least one message regarding the event; and enabling a different characteristic to be entered on a client device; sending the different characteristic of the event, wherein the different characteristic is partially entered; receiving another suggested characteristic for the event based on at least a relationship between the different characteristic and one of the plurality of other characteristics; and changing the plurality of suggested characteristics on the client device based on the other suggested characteristic, wherein the changing action occurs concurrent with the enabling action and is separate from any ordering of the recipient list for at least one message regarding the event.

16. The processor readable storage medium of claim 15, wherein receiving comprises automatically receiving.

17. The processor readable storage medium of claim 15, wherein providing to the client device, the suggested characteristic as part of the plurality of suggested characteristics comprises:

ordering the plurality of suggested characteristics based on a number of matching characteristics for each match associated with each suggested characteristic in the plurality.

* * * * *

UNITED STATES PATENT AND TRADEMARK OFFICE
CERTIFICATE OF CORRECTION

| | | |
|---|---|---|
| PATENT NO. | : 7,865,206 B2 | Page 1 of 1 |
| APPLICATION NO. | : 11/688749 | |
| DATED | : January 4, 2011 | |
| INVENTOR(S) | : Michael Quoc et al. | |

It is certified that error appears in the above-identified patent and that said Letters Patent is hereby corrected as shown below:

In column 6, line 4, delete "10" and insert -- 110 --, therefor.

In column 13, lines 10-16, delete "824. Moreover, event .......match." and insert the same on Col. 13, Line 9, after "and" as the continuation of the same paragraph.

In column 19, lines 18-19, in Claim 1, after "characteristics;" delete "and".

In column 19, line 23, in Claim 1, delete "characteristics;" and insert -- characteristic --, therefor.

In column 19, line 55, in Claim 5, delete "characteristics;" and insert -- characteristic --, therefor.

In column 20, line 42, in Claim 11, delete "event;" and insert -- event --, therefor.

In column 21, line 11, in Claim 15, delete "event;" and insert -- event --, therefor.

Signed and Sealed this
Thirty-first Day of January, 2012

David J. Kappos
*Director of the United States Patent and Trademark Office*